Nov. 12, 1968                T. E. CROMPTON                3,409,938
                    APPARATUS FOR PRODUCING FINE FIBERS
                       Original Filed June 16, 1965
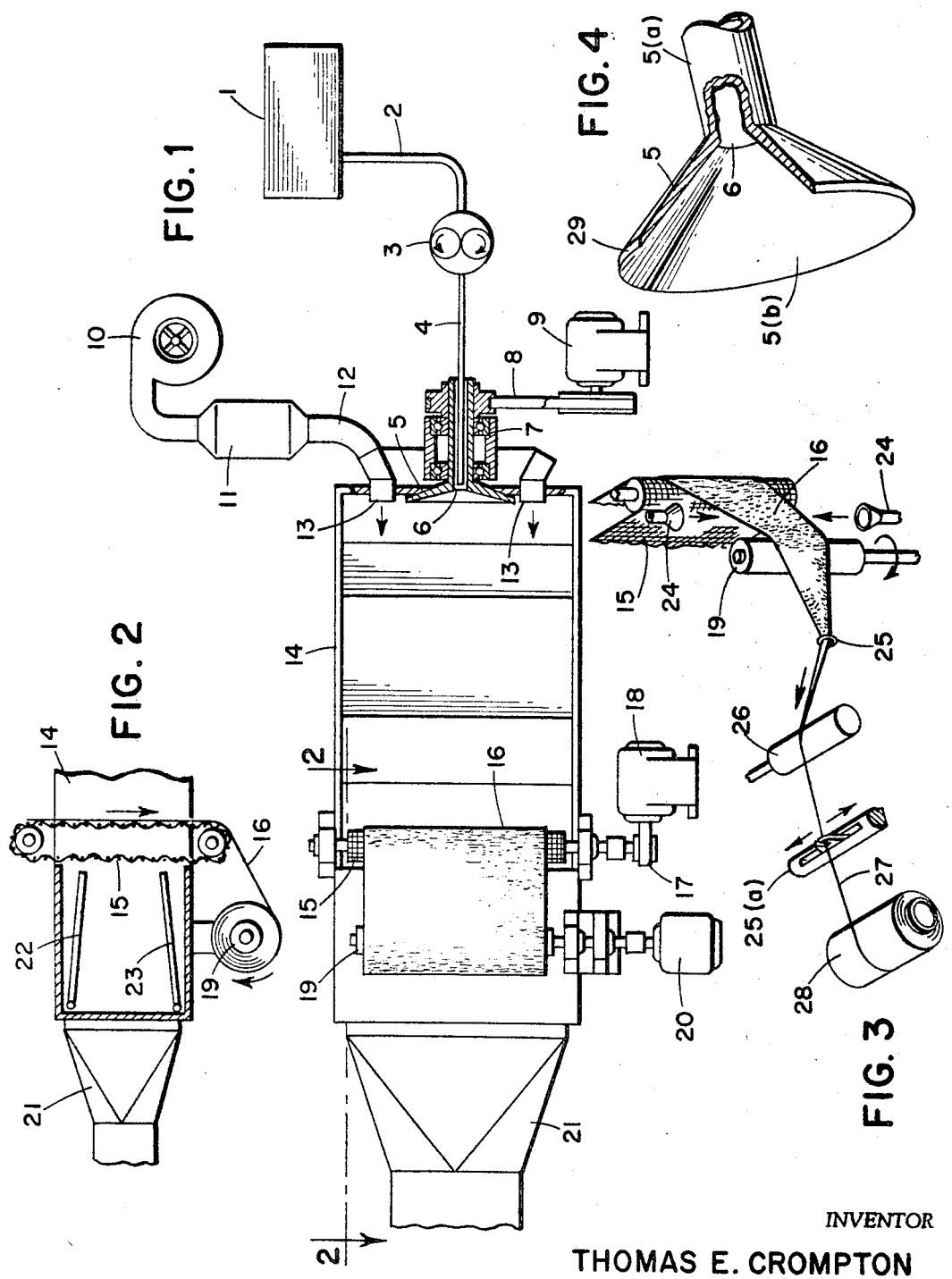
INVENTOR
THOMAS E. CROMPTON
BY Anthony J. Stewart
ATTORNEY

United States Patent Office 3,409,938
Patented Nov. 12, 1968

3,409,938
APPARATUS FOR PRODUCING FINE FIBERS
Thomas E. Crompton, Cary, N.C., assignor to Monsanto Company, St. Louis, Mo., a corporation of Delaware
Original application June 16, 1965, Ser. No. 464,477. Divided and this application June 23, 1967, Ser. No. 659,254
5 Claims. (Cl. 18—2.6)

ABSTRACT OF THE DISCLOSURE

The invention is directed to apparatus for producing fine fibers of an organic polymer and comprises a horizontally rotatable conoid disc, means to feed a polymer solution, through an aperture located in the middle of the disc, onto the concave surface of the disc, means to provide a heated, high velocity air stream surrounding the disc so as to entrain droplets emanating from the disc and form fibers by removing the solution from the droplets. There is also provided means to collect the fibers and means to collect the removed solvent.

---

This application is a division of Ser. No. 464,477 filed June 16, 1965.

Heretofore, fine fibers of synthetic organic polymers have been made by processes which involve the action of a high velocity jet of gas on a molten polymeric material. In accordance with these known processes, a molten polymer is extruded through one or more orifices into a gas stream of high velocity. The gas stream acts to break up the molten stream into small particles, which solidify, and are carried away by the gas stream. While these processes have been successful to some extent, a major problem encountered is the lack of uniformity in the shape and size of the fibers produced. When the gas stream acts on the molten polymer stream the particle forms vary greatly in size. Furthermore, when these particles are solidified, globules or beads are formed along with the fibers due in part to the difference in size and also due to the fact that some solidification occurs as the gas stream contacts the molten polymer.

Additionally, these previously known processes have been somewhat restricted in their application in the use of a molten polymer feed. In these previously known processes, the use of a polymer solution as a feed is extremely difficult due to the low viscosity of the solution and also due to the difficulties encountered in solvent removal.

It is therefore an object of this invention to provide a method for the production of uniform fine fibers of a synthetic organic polymer.

It is a further object of this invention to provide a method for the production of uniform fine fibers of a synthetic organic polymer from a solution of said polymer.

It is a further object of this invention to provide apparatus for the production of uniform fine fibers of a synthetic organic polymer from a solution of said polymer.

Other objects will become apparent from the following description.

Briefly, the method of the present invention involves feeding a solution of a synthetic organic polymer onto the internal, concave face of a rotating conoid surface, allowing said solution to substantially cover said internal concave face and be discharged as elongated droplets from the periphery of said surface by the centrifugal force resulting from the rotation of said surface, surrounding the periphery of said surface with an annular gas stream flowing substantially parallel with the axis of rotation of said surface, entraining the discharged droplets in said gas stream, removing solvent from said droplets by the action of said gas stream thus forming fine fibers of said polymers in said gas stream, and recovering said fibers formed in said stream.

The process will be more fully understood with reference to the accompanying drawings in which:

FIGURE 1 is a perspective view of the fiber-forming apparatus of this invention;

FIGURE 2 is a sectional top view of the apparatus shown in FIGURE 1 at line 2—2;

FIGURE 3 is a perspective view of a form of apparatus used to collect the fibers formed by the present invention, and FIGURE 4 is a view of a preferred form of the conoid disc used in the present invention.

There is shown in FIGURE 1 a typical arrangement of the apparatus used to carry out the present invention. A solution of a synthetic organic polymer from source 1 is passed via line 2 and pump 3 through tubular feeding means 4 onto the internal concave face of conoid disc 5 through the aperture 6. The pump 3 provides constant pressure to the solution thus allowing the solution to essentially cover the concave face of disc 5. The disc 5 is rotatably mounted in casing 7 and is rotated by chain drive 8 and motor 9. In order to produce the uniform fine fibers by the method of the present invention, the conoid disc should be capable of rotating at speeds between 1000 r.p.m. and 7000 r.p.m., preferably between 2000 and 4000 r.p.m. A gas, for example, air, from a source not shown, is forced by pump 10 through heating means 11 and line 12 and out vaned annular opening 13 into enclosure 14. The polymer solution is discharged from disc 5, by the centrifugal force resulting from its rotation, in the form of elongated droplets which are picked up in the gas stream exiting from opening 13, are carried through enclosure 14 and deposited on gathering means 15, which is shown in the form of a screen. During the passage of the droplets from disc 5 to screen 15, the action of the gas stream removes the solvent from the polymer solution thus forming fine fibers which are deposited on screen 15. Screen 15 is preferably in the form of an endless belt which is moved by drive means 17 and motor 18 in a direction perpendicular to the axis of rotation of disc 5. As the screen moves out of enclosure 14 the fibrous mat 16 formed thereon is removed and taken up, for example, on take up roll 19 driven by motor 20. The solvent remaining in the gas stream passes through the screen and is directed by baffles 22 and 23 shown in FIGURE 2, to solvent collection means 21.

While FIGURE 1 shows the removal of the fibers from the gathering means in the form of a mat, it is also possible, and in some cases desirable, to remove the fibers in the form of a yarn. This may be done by the apparatus shown in FIGURE 3 wherein air jets 24 serve to decrease the width of mat 17 as it passes over roll 19. The fibers are further compacted by passage through guide 25, over roll 26 and through guide 25(a). The yarn 27 is thence taken up on bobbin 28.

Rotating disc element 5 is more clearly shown in FIGURE 4. This element as shown in FIGURE 4 is composed of tubular neck portion 5(a) and conoid discharge surface 5(b) flaring outwardly therefrom. As shown in FIGURE 4, aperture 6 must be located centrally in disc 5. This allows uniform distribution of the polymer solution over the entire face of the disc. It is also desirable that the disc 5 terminate in a sharp edge periphery 29. This allows the solution to leave the face of the disc in elongated droplets which pass into the surrounding gas stream and also serves to prevent the solution from back flowing over the convex side of disc 5. In accordance with a preferred method of the present invention, the polymer solution is allowed to cover the inside surface of tubular neck portion 5(a) prior to its passage through aperture 6 onto discharge surface 5(b). This insures a more even distribution of the solution onto the discharge surface.

Any synthetic organic polymer that is solution-spinnable may be used in the process of the present invention. Thus, in accordance with the present invention, fibers may be made from polyacrylonitrile, polycarbonates, polyurethanes, and other like polymers which may be dissolved in a solvent and fed to the rotating disc. Likewise, mixtures of fibers may be spun in accordance with the process of the present invention either by admixing the solutions prior to their introduction through the feeding means, by having a plurality of feeding means through the aperture of the conoid disc, or by providing a plurality of discs on the same shaft. The preferred polymer for use in the method of the present invention comprises acrylonitrile and copolymers thereof.

Due to obvious economic advantages, it is preferred in accordance with the process of the present invention to employ air as the annular gas stream surrounding the periphery of the rotating disc. Since it is highly desirable that most of the solvent be removed from the polymer prior to its reaching the target, it is preferred to heat the incoming air stream in order to achieve this end. It has been found that an air stream heated to a temperature of between about 100° C. and about 350° C., preferably 250° C. to 300° C., serves to insure solvent removal from the fibers.

It is necessary that the annular gas stream be traveling at a velocity sufficient to overcome the centrifugal force imparted to the elongated droplets by the rotating cone and entrain the droplets of solution to the gathering means. Furthermore, the velocity must be sufficient to remove the solvent from the droplets. A gas stream velocity of between 1500 feet per minute and 6000 feet per minute has been found necessary for this purpose with the preferred gas velocity lying between the ranges of 2000 feet per minute and 4000 feet per minute.

The shape of disc 5 is preferably that of a cone although other shapes, for example, saucer-like shapes may be equally well employed. The only requirement is that disc 5 be of a shape which allows uniform distribution of the polymer solution over the entire face thereof.

It has been found that the concentricity of the disc is an important factor in the successful operation of the process and apparatus of this invention. That is, the peripheral edge of disc 5 must be substantially completely concentric with its axis of rotation and with the periphery of aperture 6. When disc 5 is out-of-round to any substantial degree, the polymer solution does not discharge evenly over its entire peripheral surface and globule formation results.

Fibers made in accordance with the process of the present invention are essentially uniform in shape and size. Bead formation is essentially eliminated and the diameters of the fibers range from about 5 microns to about 0.1 micron with the average diameter being between 1 and 2 microns. The fibers produced by the present invention have outstanding properties which make them useful for paper products, laminates, absorbent pads, filters, insulation and the like.

I claim:

1. Apparatus for producing fine fibers of a synthetic organic polymer comprising a conoid disc having a convex surface and concave surface, means to rotate said disc about a substantially horizontal axis, an aperture positioned centrally in said disc, tubular feeding means extending outwardly from said convex surface and adapted to discharge liquid to the concave surface of said disc through said aperture, pressure means operative to apply pressure to the polymer solution in said tubular feeding means, means surrounding the periphery of said disc to provide a heated annular gas stream flowing substantially parallel to the axis of said disc, collection means in said gas stream adapted to collect solvent from said gas stream and gathering means positioned between said collection means and said disc for removing fibers from said gas stream.

2. Apparatus as described in claim 1 wherein said gathering means comprises a movable screen, means to move said screen in a direction perpendicular to the axis of rotation of said disc and means associated therewith to remove fibrous materials from said screen.

3. Apparatus as described in claim 1 wherein said disc is cone-shaped.

4. Apparatus for producing fine fibers of a synthetic organic polymer comprising a cone-shaped disc having a concave surface and a convex surface, the concave surface of said disc being uniform and terminating in a sharp-edged periphery, an aperture located centrally in said disc, means to rotate said disc about a substantially horizontal axis, feeding means extending outwardly from said convex surface and adapted to discharge liquid through said aperture and onto said concave surface, pressure means adapted to apply pressure to the solution in said feeding means, means surrounding said disc for providing a heated annular gas stream flowing past said edge in a direction substantially parallel to the axis of rotation of said disc, collection means associated with said gas stream adapted to collect solvent from said stream and gathering means located between said collecting means and said disc adapted to remove fibers from said stream.

5. Apparatus as described in claim 4 wherein said gathering means comprises a movable screen, means to move said screen in a direction perpendicular to the axis of rotation of said disc and means associated therewith adapted to remove fibers from said screen in the form of a yarn.

References Cited

UNITED STATES PATENTS

| | | | |
|---|---|---|---|
| 2,217,235 | 10/1940 | Rieser | 18—2.6 XR |
| 2,238,204 | 4/1941 | Woods | 18—2.6 XR |
| 2,333,218 | 11/1943 | Von Pazsiczky | 18—2.6 XR |
| 3,097,085 | 7/1963 | Wallsten | 18—2.6 XR |
| 3,317,954 | 5/1967 | Crompton | 18—2.6 |

WILLIAM J. STEPHENSON, *Primary Examiner.*